(12) United States Patent
Goldberg

(10) Patent No.: US 6,256,327 B1
(45) Date of Patent: *Jul. 3, 2001

(54) RED LIGHT SOURCE

(75) Inventor: Lew Goldberg, Fairfax, VA (US)

(73) Assignee: The United States of America as represented by the Secretary of the Army, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,737

(22) Filed: Sep. 30, 1997

(51) Int. Cl.$^7$ .................................................. G01S 3/10
(52) U.S. Cl. ........................ 372/22; 372/70; 372/6; 372/98
(58) Field of Search ............................ 372/69, 70, 22, 372/98, 6

(56) References Cited

U.S. PATENT DOCUMENTS

| | | | |
|---|---|---|---|
| 4,791,631 | * 12/1988 | Baumert et al. | 372/22 |
| 4,866,720 | * 9/1989 | Holly | 372/22 |
| 5,333,142 | * 7/1994 | Scheps | 372/22 |
| 5,345,457 | * 9/1994 | Zenzie et al. | 372/22 |
| 5,408,481 | * 4/1995 | Scheps | 372/22 |
| 5,412,674 | * 5/1995 | Scheps | 372/22 |
| 5,740,190 | * 4/1998 | Moultton | 372/22 |
| 5,828,424 | * 10/1998 | Wallenstein | 372/22 |
| 5,912,910 | * 6/1999 | Sasnders et al. | 372/22 |

* cited by examiner

Primary Examiner—Leon Scott, Jr.
(74) Attorney, Agent, or Firm—John J. Karasek; Charles J. Stockstill (57) ABSTRACT

A narrow band, high power and coherent source of red light in the red (600–650 nm) spectral region is disclosed. The red light source comprises a first optical source for emitting a first light beam at a first wavelength, a second optical source for emitting a second light beam at a second wavelength, a combiner for combining the first and second light beams to produce a combined beam, and a nonlinear crystal responsive to the combined beam for producing a sum frequency light beam of red light.

16 Claims, 5 Drawing Sheets

RED LIGHT SOURCE

BACKGROUND OF THE INVENTION

1. Field of the Invention

The present invention relates to light sources and particularly to a narrow band, high power and coherent source of light in the red (600–650 nm) spectral region.

2. Background of the Invention

Photodynamic therapy (PDT) is a promising technique for location-specific treatment of cancerous tumors. Its advantages are that the process is localized to the tumor tissue so that relatively little damage occurs to the surrounding healthy tissue, and the procedure can be frequently done without surgery. The PDT technique begins with the administration of a sensitizer drug, known as a photosensitizer either topically, locally or systematically to the patient, followed by the irradiation of the lesion by light which causes selective damage to the tumor tissue. One frequently used photosensitizer is photofrin, which is photo activated with light at 630 nm. Because of a narrow absorption band of photofrin, the light must have a spectral bandwidth no wider than approximately 3 nm. In order to achieve reasonably short treatment times optical powers of greater than 1 W cw are required, and powers of 3–10 W are desirable. Typically red light is delivered to the treated area via multimode optical fiber with a diameter of a few hundred micrometers.

In dentistry, red light is required for cosmetic bleaching of tooth surfaces. The spectral and power requirements (1 W) are less stringent than in PDT. Similarly, large screen visual displays require red light with approximately 1 W cw power, but with near-diffraction limited beam quality, and broadband spectrum (typically 1–10 nanometers) for speckle-free projection.

At the present time, the only available sources of high power red light are laser diodes or dye lasers pumped by high power argon ion lasers. These systems, however, have serious drawbacks and deficiencies. Although laser diodes operating as short as 630 nm have been demonstrated, they exhibit poor lifetimes and have low output powers. While it might be possible to combine the power of a large number of such diodes through the use of multimode optical fibers, it is difficult to have all of the lasers emit within the narrow 3 nm bandwidth required for efficient photofrin absorption. In addition, the wavelengths of individual diodes can be expected to change with temperature variations and device aging. Similarly, while argon laser pumped dye lasers can generate the required narrow band powers of several watts, the approach suffers from an extremely low electrical-to-optical power conversion efficiency, leading to highly undesirable requirements of large volume water cooling and high voltage power supply lines. Such laser system is also very complex, requiring skilled personnel to maintain proper operation, and very high cost, in the range of $200–300 thousand. Another major drawback is that dye lasers require the use of toxic and hazardous dyes and solvents which have limited lifetimes and which present disposal problems.

The all-solid-state laser system which is the subject of this invention aims at circumventing all of the deficiencies of red emitting lasers just described. Because of its diode pumped solid state configuration, the disclosed laser system does away with the use of dyes, and achieves several orders of magnitude larger electrical-to-optical conversion efficiency than the argon laser based system, allowing operation with a conventional 120 v power supply, and with minimum cooling. In addition, the disclosed laser system is inherently spectrally narrow and capable of maintaining stable operating wavelength. Because of a single spatial mode output, the new laser system also lends itself well toward power scaling through the use of spatial multiplexing, where outputs of many lasers can be efficiently coupled into a multimode power delivery fiber. Finally, as will be described below, the disclosed laser system consist of relatively low cost components and is relatively simple to assemble and align, which will result in a substantially lower overall system cost than existing approaches.

SUMMARY OF THE INVENTION

It is therefore an object of the invention to provide an improved red light source of light.

Another object of the invention is to provide a low cost, compact, narrow band, high power and coherent source of light in the red (600–650 nm) spectral region for applications in photodynamic theraphy, optical displays and dental treatment.

Another object of the invention is to provide an all-solid state, laser-diode pumped source of red light.

A further object of this invention is to provide a narrow band source of light near 630 nm for photodynamic therapy (PTD) using photofrin photosensitizer.

These and other objects of this invention are achieved by providing a red light source comprising a first optical source for emitting a first light beam at a first wavelength, a second optical source for emitting a second light beam at a second wavelength, a combiner for combining the first and second light beams to produce a combined beam, and a nonlinear crystal responsive to the combined beam for producing a sum frequency light beam of red light.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENTS

In this invention, red light is generated through the process of nonlinear frequency mixing of light at approximately 1.0 µm with that at approximately 1.5 µm.

Figure 1:
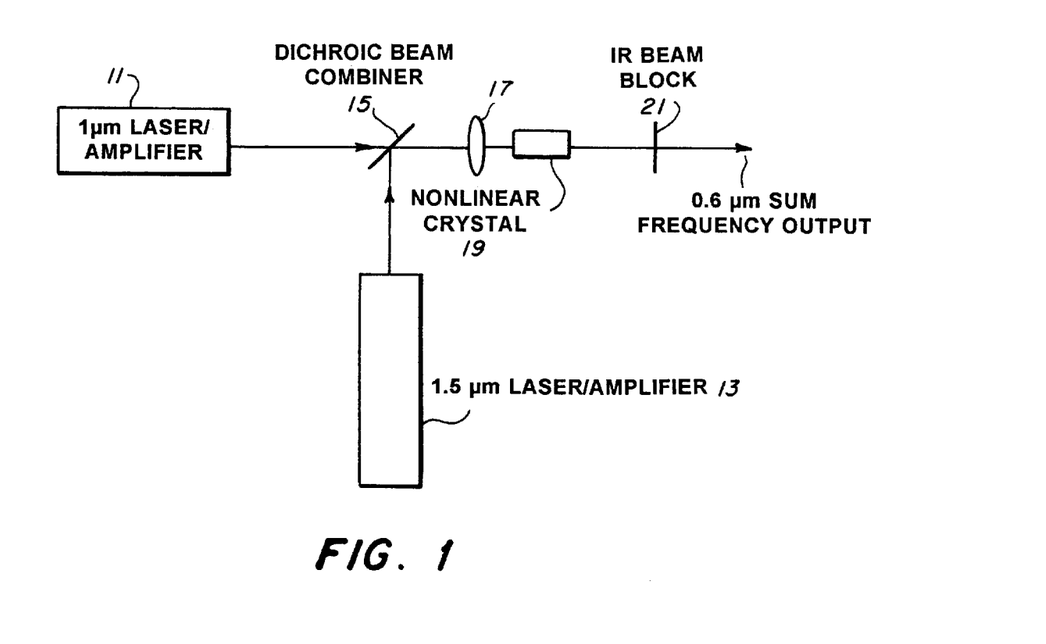
FIG. 1 is a schematic diagram of the red light source of the invention.

Referring now to the drawings, FIG. 1 illustrates a first embodiment of the red light source of the invention. The red light source of FIG. 1 requires two different optical sources, with one being a 1-micron laser or amplifier source 11 for emitting a light beam at a wavelength of about 1-micron and the other being a laser or amplifier source 13 for emitting a light beam at a wavelength of about 1.5-microns.

In operation, the 1-micron and 1.5-micron beams from the sources 11 and 13 are combined in a dichroic beam combiner 15 to spatially overlap the beams. The combined beams are then focused by a lens 17 into a nonlinear crystal 19 to cause the crystal 19 to generate an emission in the red spectral band by sum frequency mixing of the two infrared input beams. This red light has a wavelength of about 0.6 microns. An infrared (IR) beam block 21 may be placed at the output of the nonlinear crystal 19 to reflect or absorb the remnant infrared 1-micron and 1.5 micron beams and only allow the 0.6-micron, sum frequency red light to be outputted from the red light source of FIG. 1.

High efficiency, compactness, low cost, and narrow band operation, required of a practical photodynamic therapy (PDT) laser source, are achieved through the use of a unique combination of components in each of the system diagram blocks of FIG. 1. These components and the overall system operation will now be described.

Optical Sources

Figures 2, 2A:
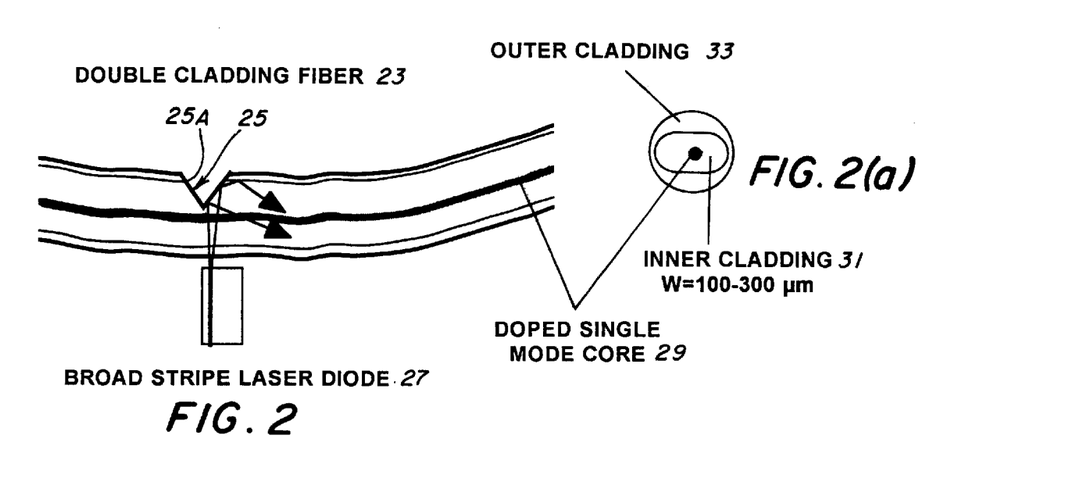
FIG. 2(a) shows a double cladding fiber and v-groove pump coupling arrangement which can be used to construct a high power amplifier either at near 1 micron or at 1.5 microns.

Laser sources which generate the 1.0 micron ($\mu$m) and 1.5 micron ($\mu$m) beams have to meet several criteria: high electrical to optical conversion efficiency, compact construction, low component costs, narrow band operation, and linear polarization output. The last condition is imposed by the nonlinear sum frequency generation which requires that for efficient wavelength conversion, the two inputs to the nonlinear crystal are linearly polarized. An optical source which meets the above requirements is a laser diode-pumped fiber amplifier, configured as shown in FIG. 2(a). FIG. 2(a) shows a double cladding fiber and v-groove pump coupling arrangement.

More specifically, FIG. 2(a) shows a double cladding fiber 23 with an embedded v-groove 25 in the fiber 25 and an exemplary pump, broad stripe, laser diode 27 in a pump-coupling arrangement which can be used to construct a high power amplifier either at near 1 micron (for amplifier 11) or at 1.5 microns (for amplifier 13). The laser consists of a double cladding optical fiber 23 (crossection shown), with a single mode core 29 containing an appropriate active dopant (not shown), and a large inner cladding 31 which is surrounded by a low refractive index outer cladding 33. Double cladding optical fibers are well known in the art. The different wavelengths of 1 micron and 1.5 microns can be generated by putting a selected one of different dopants into the core 29 of this fiber 23. The inner cladding 31 serves to guide and confine the light from the pump laser diode 27 which is gradually absorbed by the active dopant contained in the fiber core 29. To facilitate coupling of pump light generated by the high power, broad area laser diode (or diodes) 27 into the inner cladding 31, the cladding diameter is made typically 100–300 $\mu$m in diameter, comparable to the laser diode emitter width. The outer cladding 33 refractive index is sufficiently low to achieve a high maximum acceptance angle in the inner cladding 31 waveguide, to allow efficient capture of highly divergent light from the laser diode 27. In addition, the inner cladding 31 shape is typically made to be near-rectangular to prevent helical ray propagation and therefore assure nearly complete absorption of the pump light by the doped core 29.

In order to leave the fiber ends unobstructed, the pump light from the laser diode 27 is side-coupled into the inner cladding 31 through the use of the imbedded v-groove 25. Pump light incident on the facet 25A of the v-groove 25 is reflected, by total internal reflection or through the use of a high reflectivity coating (not shown) on the facet 25A, and directed along the fiber 23 axis. Multiple v-grooves 25 and pump laser diodes 27 can be used to increase the total pump power coupled into the fiber 23.

Absorption of the pump light by the active dopant in the core 29 induces optical gain for light propagating in the single mode core 29, so that the fiber 23 constitutes an optical amplifier for light injected into the core 29. With appropriate feedback at each fiber 23 end (not shown), the fiber 23 can support laser oscillation, and single spatial mode emission is generated from the output end of the fiber 23. Since a single mode fiber 23 permits propagation of light with any polarization state, special means must be taken to achieve linearly polarized laser output. This is due to the fact that one of the requirements for generating a sum frequency output in FIG. 1 is that both the 1 micron radiation from source 11 and the 1.5 micron radiation from source 13 should be linearly polarized. A technique for constructing a single polarization fiber amplifier is shown in the double pass fiber amplifier arrangement of FIG. 2(b).

Figure 2B:
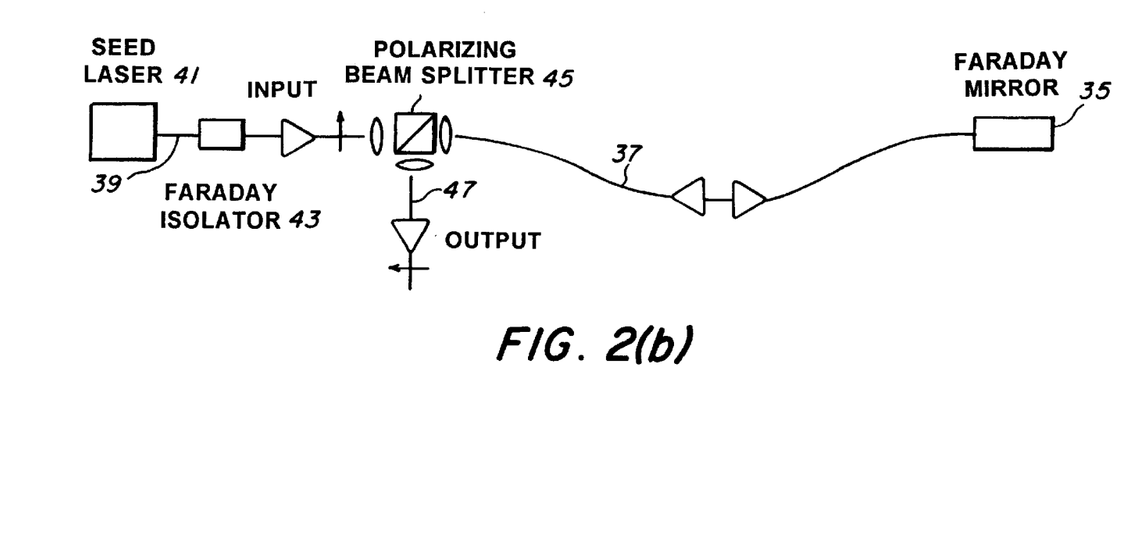
FIG. 2(b) illustrates a configuration of a single-polarization fiber amplifier.

The technique shown in FIG. 2(b) uses a Faraday mirror 35 and requires double pass propagation of light through gain fiber 37. The fiber could be of the double cladding type shown in FIG. 2(a). Linearly polarized input light 39 from a low power seed laser 41, such as a laser diode, passes through a Faraday isolator 43 and is injected into the fiber 37 through a polarizing beam splitter 45. This linearly polarized input light 39 propagates in a first pass through the gain fiber 37, undergoing a change in the polarization state. After reflection from the Faraday mirror 35 and a second pass through the fiber 37, the polarization of the light propagating through the fiber 37 returns to a linear state but is oriented perpendicular to the polarization of the input light 39. The polarizing beam splitter 45 reflects the orthogonally polarized output beam 47, spatially decoupling it from the input beam 39. This arrangement constitutes a single polarization fiber amplifier which is seeded with a narrow-band linearly polarized input light 39 to generate high power linearly polarized output light 47. The Faraday isolator 43 is placed between the seed laser 41 and the gain fiber 37 to assure frequency-stable seed laser 41 operation.

Figure 2C:
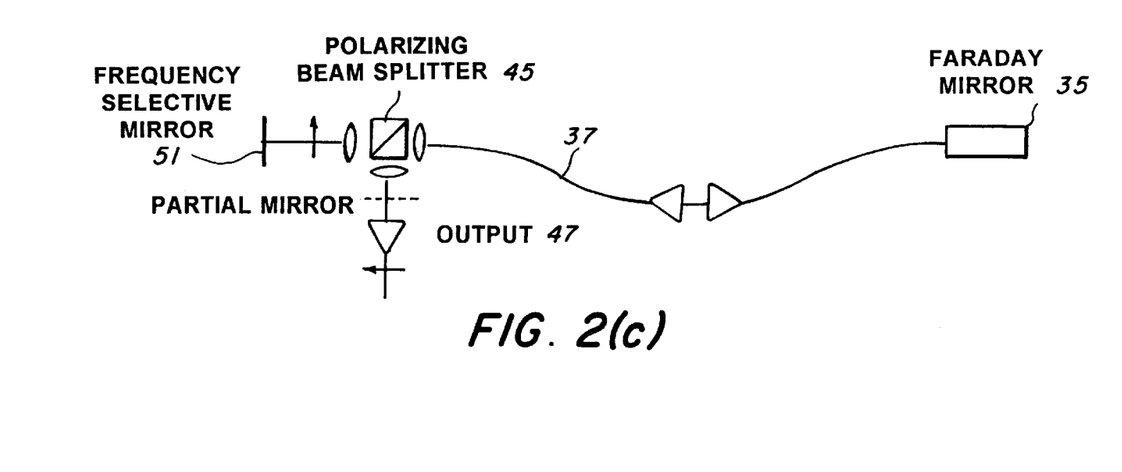
FIG. 2(c) illustrates a configuration of a single-polarizarion fiber laser.

Referring now to FIG. 2(c), a double pass fiber laser arrangement is shown. To convert the double pass fiber amplifier arrangement of FIG. 2(b) into the double pass fiber laser arrangement of FIG. 2(c), optical feedback (in the form of a reflective element) is added at the input and output end, as shown in FIG. 2(c). The seed laser 41 and Faraday isolator 43 of FIG. 2(b) are not used in the double pass fiber laser arrangement of FIG. 2(c). In order to achieve narrow-band spectral output, a frequency selective reflective element 51, such as a diffraction grating is used at the input of the polarizing beam splitter 45. The Faraday mirror 35 provides the second reflective element for the arrangement of FIG. 2(c). Alternately, a fiber with a built-in Bragg grating can be used as one of the feedback elements. The gain fiber could be of the double cladding type shown in FIG. 2(a).

Optical gain in the doped fiber core 29 occurs in a spectral range defined by the specific dopant and the pump wavelength. For generation of emission near 1.0 micron ($\mu$m) Yb (Ytterbium) is typically used, requiring a pump wavelength of 915 nm (nanometers) or 980 nm. Ytterbium exhibits optical gain in the spectral region of approximately 1020–1150 nm. Another useful dopant in this spectral band is Nd (Neodynium), which requires pumping at 810 nm. Typical dopant concentrations are in the 1–2% by weight range. Up to 10 watts (W) of cw (continuous wave) power at 1.0 micron has been generated using Nd or Yb doped fiber lasers. To generate high power emission near 1.5 microns, a fiber co-doped with Yb and Er (Erbium) is used. Although Er alone is commonly used to achieve optical gain in fiber amplifiers used in fiber communication systems, the use of a high concentration (typically 0.1 to 5% by weight, and preferably about 1%) of the Yb co-dopant allows rapid absorption of a 980 micron pump light. The Er concentration is typically in the 0.05% to 0.3% range. This rapid absorption is required to compensate for the small ratio (typically about 1:500) of the single mode core 29 to the inner cladding 31, which reduces the effective absorption length for the pump light in a double cladding fiber structure 23. After absorption of 980 micron pump light, the Yb atoms which are excited to an upper energy level transfer their energy to neighboring Er atoms, resulting in optical gain and stimulated emission in the 1520–1550 nm spectral band. Up to 4 W of cw power has been generated at 1.5 microns using Yb/Er doped fibers.

Sum Frequency Generation and Nonlinear Crystal 19

As mentioned before in the discussion of FIG. 1, to generate red light near 0.6 microns, the two (infrared) 1.0 and 1.5 micron beams from sources 11 and 13 are spatially superimposed by a dichroic beam combiner 15 and are focused by lens 17 into the nonlinear crystal 19. The nonlinear crystal generates a sum frequency emission at a wavelength $\lambda_s$:

$$\lambda_s = \lambda_1 \lambda_2 / \lambda_1 + \lambda_2 \quad (1)$$

where $\lambda_1$ and $\lambda_2$ are the wavelengths of the incident beams. For $\lambda_1=1064$ nm, corresponding to the peak of Nd doped fiber or Nd:YAG laser emission, and $\lambda_2=1535$ nm, corresponding to the peak emission wavelength of Yb/Er doped fiber amplifier or laser, the sum frequency wavelength is $\lambda_3=628.5$ nm.

One of the key components of the disclosed invention is the nonlinear crystal 19 used to perform sum frequency generation. The crystal 19 must meet several requirements: i) low cost and availability in large sizes, ii) low absorption at the incident beam and the sum frequency wavelengths, iii) phase matched operation for sum frequency generation at wavelengths of interest, iv) high nonlinear coefficient, v) small or zero walk-off angle. The last three conditions are required in order to achieve high sum frequency conversion efficiency for available incident pump powers.

A crystal 19 which meets all of the above conditions is quasi-phase-matched (QPM) LiNbO$_3$ or LiTaO$_3$, fabricated by a process of periodic field poling. Such a crystal 19 offers the advantages of non critical phase matching, resulting in a zero walk-off angle and a large angle tolerance for the crystal 19 positioning angle, good transparency for the wavelengths of interest, and most importantly, very high nonlinear coefficient. In addition the (QPM) LiNbO$_3$crystal, through a proper choice of domain period A can be engineered for any specific combination of interacting wavelengths. The phase matching condition in a QPM crystal is satisfied when:

$$n_3/\lambda_3 - n_1/\lambda_1 - n_2/\lambda_2 = 1/\Lambda \quad (2)$$

where $n_1$, $n_2$, $n_3$ is the refractive index at $\lambda_1, \lambda_2, \lambda_3$.

Figure 3:
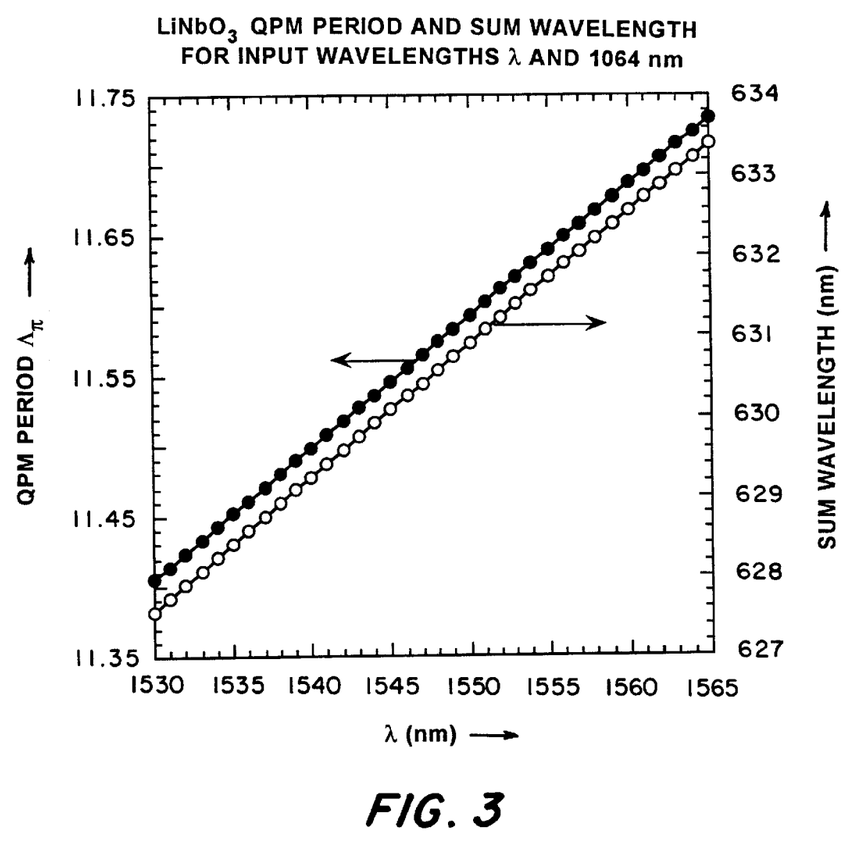
FIG. 3 shows the quasi-phase-matched (QPM) period and sum frequency wavelength for mixing 1.5 micron emission with 1.064 micron Nd:YAG output.

FIG. 3 shows the quasi-phase-matched (QPM) period and sum frequency wavelength for mixing 1.5 micron emission with 1.064 micron Nd:YAG output emission. More specifically, FIG. 3 shows the required QPM period for performing phase matched sum frequency generation of input wavelengths of $\lambda_1=1064$ nm, with $\lambda_2$ varying from 1530 nm to 1565 nm, corresponding to the high gain range of a Yb/Er fiber amplifier. The resulting sum frequency wavelength, varying from 627 nm to 635 nm, is also shown. The required QPM domain periods is approximately 11 microns, well within the range of domain periods which have been demonstrated. Since the operating range of a Yb-doped fiber amplifier is approximately 1020–1150 nm, and that of an Er-doped amplifier is 1530–1565 nm, the spectral range of sum frequency light which can be generated is 617–656 nm, corresponding to the nearly entire red region of the visible spectrum.

One of the important considerations in the disclosed laser configuration of FIG. 2(c) is the optical efficiency of the sum frequency conversion process. Sum frequency power $P_3$ is given as a function of the incident powers $P_1$ and $P_2$ by:

$$P_3 \cong [(8\omega_0^3 d^2)/(\pi n_1 n_2 n_3 \epsilon_0 c^4)] \times (hLP_1P_2) \quad (3)$$

where pump depletion is neglected, $(\omega_0=(\omega_1+\omega_2)/2$ is the mean frequency of the input beams, d is the effective nonlinear coefficient, h is a focusing parameter which equals 1.07 for optimum focusing, and $\epsilon_0$ is the free space dielectric constant. The nonlinear constant of QPM LiNbO$_3$ is given by $2d_0/\pi=17$ pm/v, where $d_0=27$ pm/v is the nonlinear coefficient of bulk LiNbO$_3$. For the case of $P_1=1$ W, $P_2=1$ W and a L=1.0 cm long crystal, the above equation predicts $P_3=0.06$ W. For a longer crystal of 5 cm and higher pump powers of $P_1=2$ W, $P_2=2$ W, a sum frequency power of 1.2 W is calculated. Although the actual sum frequency power is expected to be somewhat smaller because of significant pump depletion, this results shows that multi-watt output powers near 630 nm are feasible with reasonable crystal lengths and infrared pump powers.

For the case of low average output power of the fiber sources, large conversion efficiency can still be achieved if the amplifiers are operated in pulsed mode. Pulsed output can be easily achieved in the case of the optical amplifier configuration of FIG. 2(b), by operating the seed laser 41 (FIG. 2(b) in a pulsed mode. When seeded with short pulses with a risetime of a few nanoseconds (well within direct current modulation capability of laser diodes) the peak power level $P_p$ of the amplified pulses generated by the fiber amplifier (of FIG. 2(b)) are given by $P_p=G_sP_i$, where $P_i$ is the seed power, and $G_s$ is the small signal gain of the amplifier. For a typical fiber amplifier, small signal gain 30 dB, a seed power of only 100 mW is required to produce an output pulse with a 100 W peak power. For a pulse repetition period which is much shorter than the excited state lifetime (10 ms [milliseconds] for Er and 0.5 ms for Nd) of the active dopant, the output power can be maintained close to that which would occur under cw operation. To assure temporal coincidence between the pulses generated by the 1.0 micron fiber amplifier and the 1.5 micron amplifier, the two seed laser diodes can be driven by a single pulse generator. From the above discussion of sum frequency conversion efficiency, it is clear that such high peak powers would produce efficient conversion of the infrared pump power into red emission.

Alternative Configurations

Figure 4:
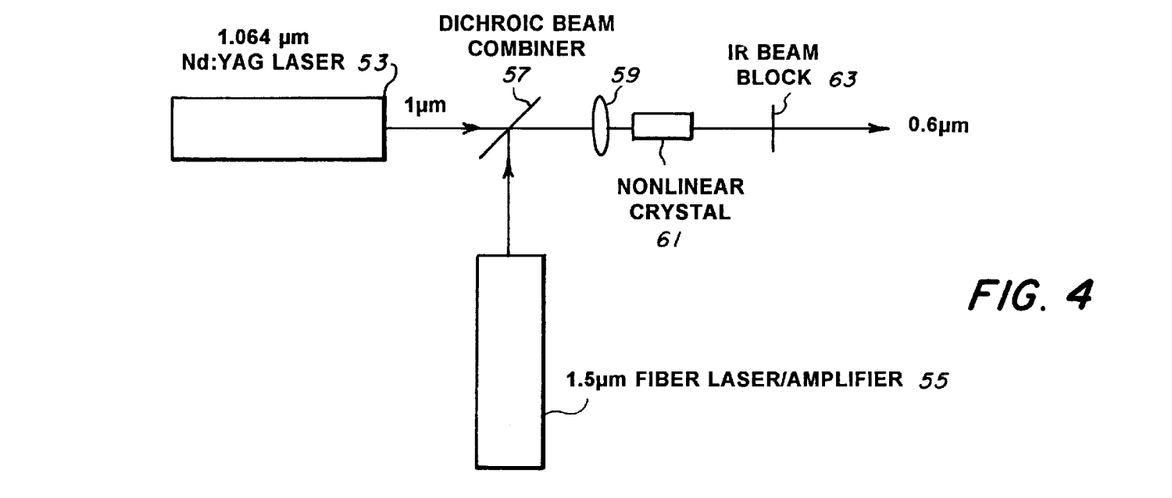
FIG. 4 shows a first alternative embodiment of a red light source using a Nd:YAG laser.
Figure 5:
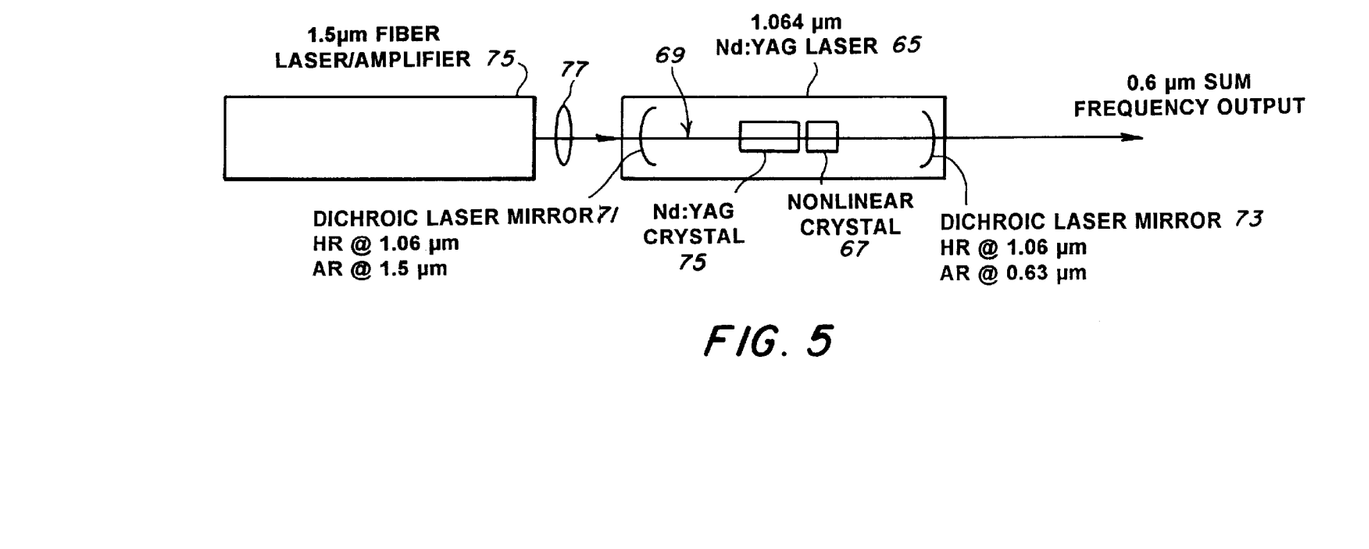
FIG. 5 shows a second alternative embodiment of a red light source using a Nd:YAG laser and an intracavity nonlinear crystal placement.
Figure 6:
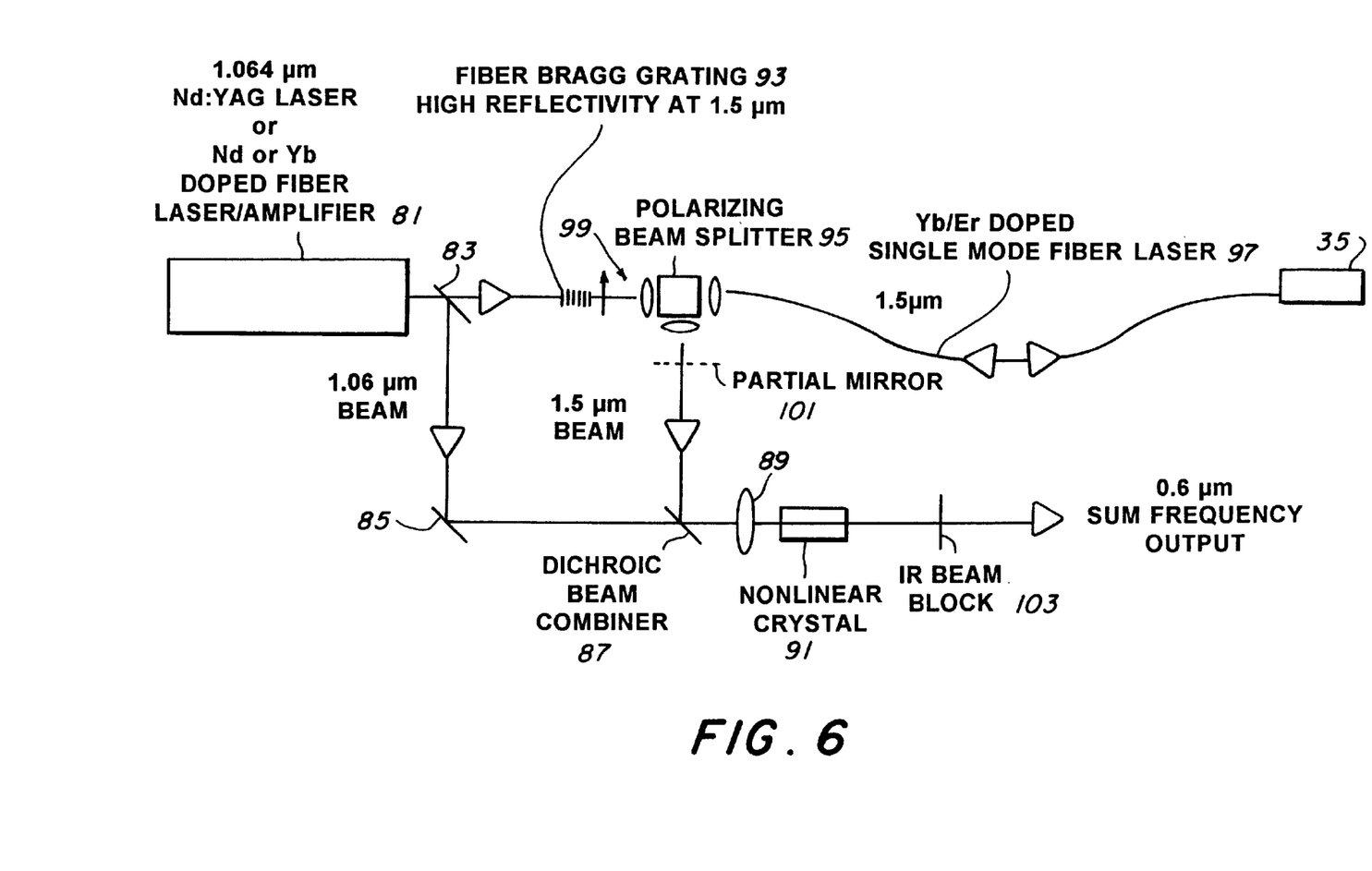
FIG. 6 shows a third alternative embodiment of a red light source using a Nd:YAG laser or a Nd- or Yb-doped fiber laser/amplifier for the Yb/Er-doped 1.5 micron fiber amplifier.

Several alternative embodiments for the red light source are shown in FIGS. 4, 5 and 6.

In FIG. 4, a lamp or diode-pumped Nd:YAG laser 53 is used to provide high power pump light at 1.06 µm. Such lasers are commercially available and generate high power (over 10 W) of cw emission at 1.06 nm with narrow spectrum.

In the operation of the embodiment of FIG. 4 the pump lasers are comprised of a 1.064 micron Nd:YAG laser 53 and a 1.5 micron fiber laser or amplifier 55. The outputs of these two sources 53 and 55 are combined with a dichroic beam combiner 57 which reflects light at 1.5 microns and transmits light at 1.064 microns. After the 1.064 and 1.5 micron beams are combined by the combiner 57, the combined beams are focused by a lens 59 into a nonlinear crystal 61. The nonlinear crystal 61 is responsive to the combined beams for generating the sum frequency red light at a wavelength of about 0.6 microns. In the path of the beam there is an IR (infrared) beam block 63 which absorbs or reflects the 1.064 and 1.5 micron infrared beams and only allows the red light at about 0.6 microns to pass therethrough as output light.

If the source 55 is a 1.5 micron laser, it would look like the laser shown in FIG. 2(c). On the other hand, if the source 55 is a 1.5 micron amplifier, it would look like the amplifier shown in FIG. 2(b) and contain the seed laser 41 in it. As mentioned before the seed laser 41 in FIG. 2(b) could be a laser diode. Although such a laser diode would generate a weak signal, that weak signal would be amplified in the amplifier of FIG. 2(b).

Another embodiment of a red source is shown in FIG. 5 which is different from the embodiments shown in FIGS. 1 and 4. The embodiment of FIG. 5 uses intracavity sum frequency generation, where the nonlinear crystal 67 is placed inside a resonant cavity 69 of a Nd:YAG laser 65. More specifically, the nonlinear crystal 67 is placed between the two dichroic laser end mirrors 71 and 73 of the cavity 69. The dichroic laser mirror 71 is coated to be highly reflective (HR) at 1.06 microns and anti-reflective (AR) at 1.5 microns. On the other hand, the dichroic laser mirror 73 is coated to be highly reflective at 1.06 microns and anti-reflective at 0.63 microns to allow 0.6 micron red light to be transmitted out of the cavity 69. The gain medium of the laser 65 is a Nd:YAG crystal 75 which is placed between the nonlinear crystal 67 and one of the end laser mirrors such as the mirror 71.

In the operation of the embodiment of FIG. 5, light from a 1.5 micron fiber laser (FIG. 2(c)) or amplifier (FIG. 2(b)) is incident on a Nd:YAG laser and passes through the dichroic laser mirror 71.

So in the embodiment of FIG. 5 the sum frequency light is generated inside of the cavity 69 of this Nd:YAG laser by mixing the 1.5 micron light which is incident from the source 75 and mixing it in the nonlinear crystal 67 with the intracavity 1.06 micron light from the Nd:YAG laser. It is the nonlinear crystal 67 which does the sum frequency mixing to produce the 0.6 micron red light which is transmitted out of the cavity 69 by way of the dichroic laser mirror 73.

The advantage of the placement of the nonlinear crystal 67 in an intracavity position inside the Nd:YAG laser 65 is that the circulating power inside the laser cavity 69 is approximately one hundred times larger than the output power outside the cavity 69. When a 1.5 micron pump beam from a laser/amplifier 75 is focused by a lens 77 into the laser cavity 69 through the dichroic cavity mirror 71, this results in a much higher sum frequency mixing efficiency than the possible crystal 67 placement outside the cavity 69. The red sum frequency signal is generated unidirectional to the right of the nonlinear crystal 67 and is coupled out of the laser cavity through the dichroic cavity mirror 73 which is transparent near 630 nm.

Another embodiment of a red source is shown in FIG. 6. In FIG. 6, a light source 81 operates to generate light at 1.06 microns. The light source 81 can either be a 1.064 micron Nd:YAG laser or a Nd (Neodymium) or Yb (Ytterbium)-doped fiber laser amplifier. This fiber laser or amplifier could take the form of the amplifier of FIG. 2(b) or the laser of FIG. 2(c), depending on what the fiber is doped with. If the fiber is doped with Nd or Yb, it generates light at near 1.06 microns. (If the fiber is doped with Er (erbium) or Er/Yb, it can generate light at near 1.5 microns.)

For purposes of this description, the light source 81 emits light at 1.06 microns. Then the light emerging from this 1.06 micron source 81 is split into two parts by a beam splitter 83. One part is directed down, reflected by a mirror 85, goes through a dichroic beam combiner 87 and is then focused by a lens 89 into a nonlinear crystal 91. The other part of the 1.06 micron beam that was generated by the Nd or Yb doped laser or amplifier of the light source 81 passes through the beam splitter 83, a fiber Bragg grating 93 having high reflectivity at 1.5 microns, and a polarizing beam splitter 95 and serves to pump an Yb/Er (Ytterbium/Erbium)-doped single mode fiber laser 97. The laser cavity 99 of the laser 97 is similar to that shown in FIG. 2(c), with the exception that this cavity 99 is shown being pumped by the 1.06 micron laser beam from the light source 81.

The cavity 99 is formed between the fiber Bragg grating 93, which is highly reflective at 1.5 microns, and a partial mirror 101 which is represented by a dashed line. The fiber Bragg grating 93, which passes the 1.06 micron beam, constitutes one of the mirrors of the cavity 99. The partial mirror 101 operates as the second mirror of the cavity 99.

In operation the laser 97 is pumped by the 1.06 micron beam. As a result, the 1.06 micron enters the fiber laser 97, is absorbed by the dopants, by the Yb. This absorption of the 1.06 micron light by the dopants causes a population inversion of the Er atoms which then produces a gain at 1.55 microns. So the output of this fiber laser 97 is at 1.5 microns. This 1.5 micron output passes through the partial mirror 101 and is incident on the dichroic beam combiner 87. The combiner 87 then reflects the 1.5 micron beam and combines it with the 1.06 micron beam. Then the combined 1.5 and 1.06 micron beams are both incident on the nonlinear crystal 91, causing the linear crystal 91 to perform the sum frequency generation to generate red light at about 0.6 microns. The red light is separated by an IR beam block 103 from the remnant infrared beams at 1.06 and 1.5 microns before being outputted as a 0.6 micron sum frequency output. So after the IR beam block 103 only the red light is emitted, with remnant infrared 1.06 and 1.5 micron beams being reflected back or absorbed by the IR beam block 103.

Advantages and New Features of the Invention

The red light source of the invention offers the following advantages and features which are not otherwise available in other laser sources operating in the red spectral region: i) all solid state construction, ii) compact configuration and efficient electrical to optical power conversion, iii) wide choice of generated wavelengths in the red 617–656 nm range, iv) narrow band emission, v) pulsed operation with flexible pulse length and duty cycle characteristics vi) low fabrication costs, and long operating lifetime (based on long lifetimes of pump laser diodes), vii) requires no consumable materials such as dyes, solvents or gases, viii) the output beam is diffraction limited.

Alternatives

Alternatives to the disclosed red light source are a HeNe gas laser, dye lasers pumped by an Ar ion gas laser, and fiber coupled laser diodes emitting in the red. A HeNe laser emits at 632.8 nm and typically generates maximum powers of only 100 mW, insufficient for the photodynamic therapy application. Dye lasers, as discussed above, suffer from poor efficiency, very high cost, and the requirement for frequent dye and solvent replacements. Although laser diodes emitting in the red spectral range have been demonstrated, and it is possible, through the use of multimode optical fibers, to couple many laser diodes in order to generate the required multi-watt power levels, this approach suffers from two major difficulties. The first is that currently laser diodes operating near 630 nm suffer from poor operating lifetime, and the second is that since each diode operates at a slightly different wavelength, it is unlikely that a large number of laser diodes will emit within the required 3 nm bandwidth. In addition, laser diode based systems would produce a multi-spatial-mode output which leads to a lower achievable power density and is unattractive for applications in optical displays.

Therefore, what has been described is a red light source comprising a first optical source for emitting a first light beam at a first wavelength, a second optical source for emitting a second light beam at a second wavelength, a combiner for combining the first and second light beams to produce a combined beam, and a nonlinear crystal responsive to the combined beam for producing a sum frequency light beam of red light.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A red light source comprising:
    a first optical source for emitting a first light beam at a first wavelength of approximately 1.0 microns, said first optical source comprising a fiber laser selected from the group of Yb, Nd, and Md:YAG;
    a second optical source for emitting a second light beam at a second wavelength of approximately 1.5 microns, said second optical source comprising a fiber laser selected from the group consisting of Er, Yb, and Er:Yb;
    a combiner for combining the first and second light beams to produce a combined beam; and
    nonlinear means responsive to the combined beam for sum frequency mixing the first and second light beams in the combined beam to produce a beam of red light in the spectral region from about 600 nm to about 650 nm.

2. The red light source of claim 1 wherein:
    said first optical source is a 1.064 micron Nd:YAG laser; and
    said second optical source is a 1.5 micron fiber laser or amplifier.

3. The red light source of claim 2 further including:
    an infrared beam block disposed at the output of said nonlinear crystal for absorbing or reflecting the 1.064 micron and 1.5 micron beams and only allowing the red light at about 0.6 microns to pass therethrough as output light.

4. The red light source according to claim 1, wherein said spectral region of said red light is in the range from about 617 nm to about 656 nm.

5. A red light source comprising:
    a first optical source for emitting a first light beam at a first wavelength of about 1-micron, said first optical source comprising a fiber laser selected from the group consisting of Yb, Nd, and Nd"YAG;
    a second optical source for emitting a second light beam at a second wavelength of about 1.5 microns, said second optical source comprising a fiber laser selected from the group consisting of Er, Yb, and Er"Yb;
    combiner for combining the first and second light beams, said combiner being a dichroic beam combiner to spatially overlap the 1-micron and 1.5-micron first and second beams respectively so as to produce the combined beam and
    nonlinear means responsive to the combined beam for sum frequency mixing the first and second light beams in the combined beam to produce a beam of red light.

6. The red light source of claim 2 wherein:
    said first optical source is selected from the group consisting of a laser source and an amplifier source comprised of a first seed laser followed by a first optical amplifier for seeding said first optical amplifier with the first light beam; and
    said second optical source is selected from the group consisting of a second laser source and a second amplifier source comprised of a second seed laser followed by a second optical amplifier for seeding said second optical amplifier with the second light beam.

7. The red light source according to claim 6, wherein said first seed laser is operable in a pulsed mode.

8. The red light source of claim 2 wherein:
    said nonlinear means is a nonlinear crystal responsive to the combined beam for sum frequency mixing the first and second light beams in the combined beam to produce a beam of red light at a wavelength of about 0.6 microns.

9. The red light source of claim 8 wherein:
    said 1-micron and 1.5 micron beams input to said nonlinear crystal are linearly polarized.

10. The red light source of claim 9 wherein:
    said nonlinear crystal is quasi-phase-matched $LiNbO_3$ or $LiTaO_3$.

11. The red light source of claim 5 wherein said nonlinear means includes:
    a nonlinear crystal; and
    a lens for focusing the combined beam into said nonlinear crystal to cause said crystal to generate an emission in the red spectral band by sum frequency mixing of the combined beam to produce a red light at a wavelength of about 0.6 microns.

12. A red light laser source comprising:
    a laser having a resonant cavity defined by first and second dichroic laser end mirrors opposing each other on a common axis to from a reflective path there between, said laser emitting a light at a first wavelength of approximately 1.0 microns, said laser being a fiber laser selected from the group consisting of Nb, Nd, Nd:YAG;
    an optical source for producing light at a second wavelength of approximately 1.5 microns, said optical source comprising a fiber laser selected from the group consisting of Er, Yb, and Er:Yb;

a nonlinear crystal placed inside said resonant cavity of said laser for performing sum frequency mixing of said first and second wavelengths of light to produce light at a sum frequency, said nonlinear crystal disposed between said first and second dichroic end mirrors, said first dichroic laser end mirror being coated to be highly reflective at said first wavelength and anti-reflective at said second wavelength, said second dichroic laser end mirror being coated to be highly reflective at said first wavelength and coated with an anti-reflective coating of a third wavelength so as to allow the sum frequency light to be transmitted out of said resonant cavity.

13. The red light laser according to claim 12, wherein said third wavelength is about 0.63 microns.

14. The red light laser source according to claim 12, wherein the sum frequency light is in the spectral region of from about 600 nm to about 650 nm.

15. The red light source according to claim 14, wherein said spectral region of is in the range from about 617 nm to about 656 nm.

16. A red light source comprising:

a first optical source for emitting a first light beam at a first wavelength of 1064 nm, said first optical source comprising a fiber laser selected from the group consisting of Yb, Nd, and Nd:YAG;

a second optical source for emitting a second light beam at a second wavelength in the range of 1530 nm to 1565 nm, said second optical source comprising a fiber laser selected from the group consisting of Er, Yb, and Er:Yb;

a combiner for combining the first and second light beams to produce a combined beam; and a nonlinear crystal consisting of quasi-phase-matched $LiNbO_3$ responsive to the combined beams for sum frequency mixing the first and second light beams in the combined beam to produce a beam of red light in the spectral region in the range from 627 to 635 nm.

* * * * *